US010914969B2

(12) United States Patent
Schmeing et al.

(10) Patent No.: US 10,914,969 B2
(45) Date of Patent: *Feb. 9, 2021

(54) MICROWAVE-TO-OPTICAL TRANSDUCER (71) Applicant: International Business Machines Corporation, Armonk, NY (US)

(72) Inventors: Katharina Schmeing, Zurich (CH); Paul F. Seidler, Thalwil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/734,600

(22) Filed: Jan. 6, 2020

(65) Prior Publication Data
US 2020/0142225 A1   May 7, 2020

Related U.S. Application Data

(63) Continuation of application No. 16/102,104, filed on Aug. 13, 2018, now Pat. No. 10,578,891.

(51) Int. Cl.
*H04B 10/00* (2013.01)
*G02F 1/01* (2006.01)
(Continued)

(52) U.S. Cl.
CPC ........... *G02F 1/0128* (2013.01); *G06N 10/00* (2019.01); *H04B 10/70* (2013.01); *G02F 2202/32* (2013.01)

(58) Field of Classification Search
CPC .............. H04B 10/516; H04B 10/2575; H04B 10/25752; H04B 10/25753; H04B 10/70;
(Continued)

(56) References Cited

U.S. PATENT DOCUMENTS 6,201,638 B1   3/2001   Hall et al.
6,668,106 B1   12/2003  Levine et al.
(Continued)

FOREIGN PATENT DOCUMENTS

WO     03061113 A2    7/2003

OTHER PUBLICATIONS

Amit Vainsencher et al., "Bi-directional conversion between microwave and optical frequencies in a piezoelectric optomechanical device," Applied Physics Letters, 109,033107, Jul. 20, 2016; 5 pages.

(Continued)

*Primary Examiner* — Hanh Phan
(74) *Attorney, Agent, or Firm* — Cantor Colburn LLP; Daniel Morris (57) ABSTRACT

Embodiments are directed to a microwave-to-optical transducer device. The device includes an anchorage structure that includes a bar extending in a plane and laterally delimiting two voids on each longitudinal side of the bar. That is, the two voids are arranged side-by-side in said plane. The device further includes a piezoelectric beam structured as an optical cavity (e.g., as a 1D photonic crystal cavity), where the beam extends transversally to the bar, parallel to said plane, and is anchored on a resting point on the bar. The beam extends outwardly, beyond the resting point and on each side thereof, so as to overhang each of the two voids. Embodiments are further directed to related microwave circuits, including a microwave-to-optical transducer such as described above and, in particular, to superconducting microwave circuits configured as quantum information processing devices.

20 Claims, 4 Drawing Sheets

(51) Int. Cl.
*H04B 10/70* (2013.01)
*G06N 10/00* (2019.01)

(58) Field of Classification Search
CPC .. H04B 10/505; H04B 10/40; H04B 10/2507; B81B 3/0029; G06N 99/002; G02B 6/29341
USPC ........ 398/115, 116, 117, 183, 188, 192, 193, 398/194, 158, 159, 135, 136; 257/9, 33; 250/241.1, 200, 216, 221
See application file for complete search history.

(56) References Cited

U.S. PATENT DOCUMENTS

| | | | |
|---|---|---|---|
| 9,296,609 | B2 | 3/2016 | Park |
| 9,857,609 | B2 | 1/2018 | Bishop et al. |
| 10,578,891 | B1* | 3/2020 | Schmeing ............. G02F 1/0128 |
| 2013/0341529 | A1 | 12/2013 | Bergeron |
| 2015/0060756 | A1* | 3/2015 | Park ..................... G02B 6/1225 257/9 |
| 2017/0227795 | A1* | 8/2017 | Bishop ............... G02B 6/29341 |
| 2017/0248832 | A1 | 8/2017 | Kippenberg et al. |
| 2018/0113373 | A1 | 4/2018 | Witmer et al. |
| 2020/0062583 | A1 | 2/2020 | Painter et al. |

OTHER PUBLICATIONS

Chang-Ling Zou et al., "Cavity piezomechanical strong coupling and frequency conversion on an aluminum nitride chip," Physical Review A94, DOI:10.1103/PhysRevA.94.013812, Jul. 6, 2016; pp. 1-7.

Huan Li et al., "Nanophotonic cavity optomechanics with propagating acoustic waves at frequencies up to 12 GHz," Optica, vol. 2, No. 9, Sep. 2015; pp. 826-831.

Joerg Bochmann et al., "Nanomechanical coupling between microwave and optical photons," Nature Physics, DOI: 10.1038/NPHYS2748, Sep. 15, 2013; pp. 712-716.

Katharina Schmeing et al., "Microwave-to-Optical Transducer," U.S. Appl. No. 16/102,104, filed Aug. 13, 2018.

Krishna C. Balram et al., "Coherent coupling between radiofrequency,optical and acoustic waves in piezooptomechanical circuits," Nature Photonics, DOI: 10.1038/NPHOTON.2016.46, Mar. 28, 2016; pp. 346-353.

List of IBM Patents or Patent Applications Treated as Related; (Appendix P); Date Filed: Jan. 6, 2020, 2 pages.

R.W. Andrews et al., "Bidirectional and efficient conversion between microwave and optical light," Nature Physics, DOI: 10.1038/NPHYS2911, Mar. 28, 2014; pp. 346-353.

* cited by examiner

MICROWAVE-TO-OPTICAL TRANSDUCER

DOMESTIC PRIORITY

This application is a continuation of U.S. patent application Ser. No. 16/102,104, filed Aug. 13, 2018, the disclosure of which is incorporated by reference herein in its entirety.

BACKGROUND

The present invention generally relates to microwave and optical devices, and more specifically, to microwave-to-optical transducers.

Optical microcavities are known to confine light to a small volume. Devices using optical microcavities are today in many fields, ranging from optoelectronics to quantum information. Many types of optical cavities are known, such as Fabry-Perot-like cavities. The geometry (including thickness or width) of the cavity determines the "cavity modes", i.e., particular electromagnetic field patterns formed by light confined in the cavity. An ideal cavity would confine light indefinitely (that is, without loss). The deviations from this ideal paradigm are either intentional (e.g., outcoupling) or due to design related limitations, fabrication related limitations, or imperfections (e.g., scattering). They are captured by the quality factor Q, which is proportional to the confinement time in units of the optical period. Another descriptive parameter is the effective mode volume (V), which relates to the spatial extent of the optical mode present in the cavity. In general, the realization of practical devices requires maximizing the ratio Q/V, i.e., high values for Q and low values for V are important to increase light-matter interactions in processes such as spontaneous emission, nonlinear optical processes and strong coupling.

Photonic crystals are natural or artificial structures with periodic modulation of the refractive index. Depending on the geometry of their structure, photonic crystals can be categorized as one-dimensional (1D), two-dimensional (2D) and three-dimensional (3D) structures. In one-dimensional photonic crystals, the periodic modulation of the permittivity occurs in one direction only. Well-known examples of photonic crystals are Bragg gratings, commonly used as distributed reflectors in vertical cavity surface emitting lasers. Quasi one-dimensional photonic crystal cavities are known, e.g., comprising a freestanding cavity that comprises periodic holes and a defect at the center. The central defect may for instance comprise tapered subsets of holes. For example, a concept for a photonic crystal nanobeam cavity has been proposed in J. Bochmann, A. Vainsencher, D. D. Awschalom and A. N. Cleland., "Nanomechanical Coupling between microwave and optical photons", Nat. Phys. 9, 712 (2013), in which electrodes are directly attached to the nanobeam.

Cavity optomechanical systems are sometimes used in quantum information processing applications. Recent advances in quantum computing are making such a technology ever more relevant to industrial applications. Quantum computing makes direct use of quantum-mechanical phenomena, such as superposition and entanglement to perform operations on entangled quantum bits (qubits), i.e., information stored in quantum states. Superconducting circuits are relatively easy to manufacture with current technologies and are thus promising candidates to further scale quantum information technologies. Today, it can be envisioned that in the near term a small quantum computer, based on a couple of hundreds of superconducting qubits with limited to no error correction, will be able to simulate quantum systems intractable to conventional computers.

SUMMARY

Embodiments of the present invention are directed to a microwave-to-optical transducer device. The device comprises an anchorage structure that comprises a bar extending in a plane and laterally delimiting two voids in the plane, on each longitudinal side of the bar. The device further comprises a piezoelectric beam structured as an optical cavity (e.g., as a 1D photonic crystal cavity), where the beam extends transversally to the bar, parallel to the plane, and is anchored on a resting point on the bar. The beam extends outwardly, beyond the resting point and on each side thereof, so as to overhang each of the two voids.

Because of the above structure, outer portions of the photonic crystal cavity beam extend beyond the anchor point to allow free, unclamped motion of a stationary mechanical mode (e.g., allowing motion perpendicularly to the anchoring axis).

In embodiments of the invention, the beam is configured in the device so as for a piezoelectrically-induced mechanical motion of the beam to have a largest component in a direction distinct from a direction normal to the plane. The beam may for instance be configured so as for the piezoelectrically-induced motion to be (essentially) confined to the plane.

In preferred embodiments, the device comprises two electrodes arranged so as to contact the beam on opposite points thereof, the opposite points defining a contact axis that is perpendicular to the plane. Preferably, the contact axis extends (and/or is predefined to extend) parallel to an axis of electrical polarization of the beam, in operation.

In embodiments, the two electrodes are, each, at least partly arranged on the bar. Preferably, the opposite contact points that define the contact axis are (predefined to be) located at anti-nodes of a stationary mechanical mode corresponding to the piezoelectrically-induced mechanical motion, in operation.

In preferred embodiments, each of the electrodes extends, at least partly, on a surface of the bar that is opposite to a longitudinal face of the beam. Preferably, a first one of the electrodes extends on the surface of the bar, on one longitudinal side of the beam, whereas a second one of the electrodes partly extends on that same surface but on another longitudinal side of the beam.

In embodiments, the first one of the electrodes extends up to one of the opposite points on the longitudinal face, whereas the second one of the electrodes comprises a first portion, which extends on the surface of the bar, and a second portion that connects the first portion to the other one of the opposite points.

In terms of materials, each of the electrodes preferably includes a potentially superconducting material, such as niobium. The beam shall preferably comprise gallium phosphide, e.g., in single crystalline form.

In embodiments, the anchorage structure includes two bars (including the bar), which extend oppositely in the plane, so as to delimit three voids (including the two voids) in the plane. Two of the three voids are on outer sides of the two bars in the plane, whereas a remaining one of the three voids is between the two bars. The beam extends transversally to each of the two bars and is anchored on two resting points on the two bars, respectively, whereby two outer ends of the beam extend outwardly, beyond the two resting points, so as for the beam to extend over each of the three voids.

Preferably, the anchorage structure comprises two distinct anchorage elements, each structured as a frame interconnecting one of the two bars to other members of the frame.

Embodiments of the present invention are directed to a microwave circuit, comprising a microwave-to-optical transducer such as described above. The transducer may, for example, be configured in the circuit, as one of a modulator, an amplifier, and/or a receiver.

In embodiments, the circuit is a superconducting microwave circuit configured as a quantum processing device. The circuit comprises a superconducting qubit and a drive line connected to the qubit (and predefined) for driving the qubit, in operation. The transducer is connected to the drive line so as to drive the qubit by applying a microwave signal to the drive line, upon optical stimulation of the transducer. Preferably, the circuit further includes an optical communication medium adapted to couple light into and/or out of the transducer.

BRIEF DESCRIPTION OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

The accompanying drawings show simplified representations of devices or parts thereof, as involved in embodiments. Technical features depicted in the drawings are not necessarily to scale. Similar or functionally similar elements in the figures have been allocated the same numeral references, unless otherwise indicated.

DETAILED DESCRIPTION

Turning now to an overview of the aspects of the invention, one or more embodiments of the invention provide a transducer comprising a piezoelectric beam, structured as an optical cavity. The proposed concept allows transduction in both the classical and quantum regime. Embodiments of the invention can advantageously be used in a microwave circuit such as a superconducting microwave circuit as used for quantum information processing devices. As the present Inventors were investigating solutions to communicate with a superconducting quantum computer device over long distances, they came to invent and develop a new concept of microwave-to-optical transducers, proposing a novel mechanical configuration for a cavity comprising an opto-mechanical beam.

Figure 1A:
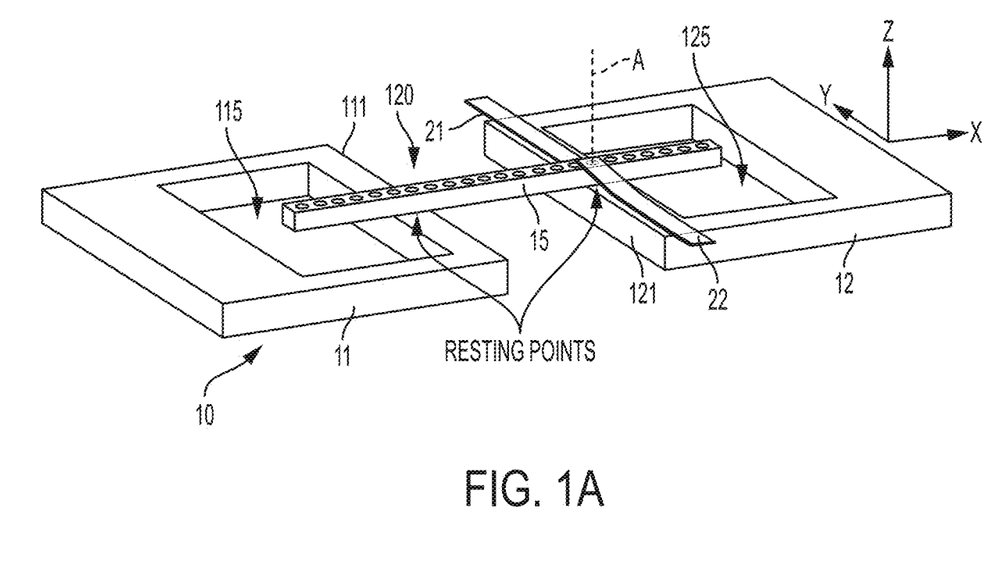
FIG. 1A is a three-dimensional view of a microwave-to-optical transducer device according to embodiments of the invention.
Figure 1B:
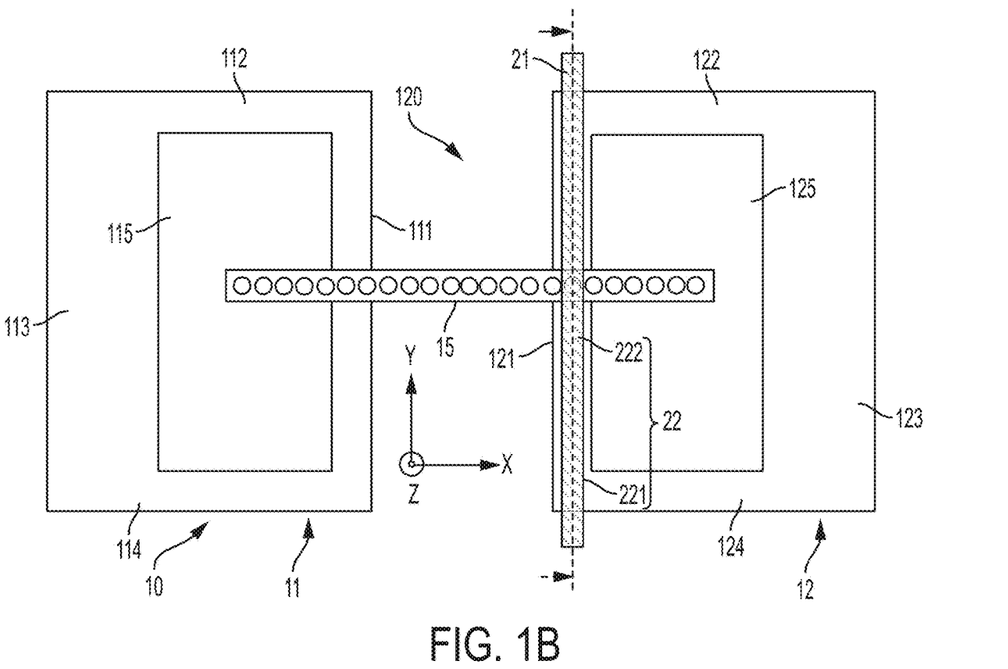
FIG. 1B is a top view of the microwave-to-optical transducer device according to embodiments of the invention.
Figure 1C:
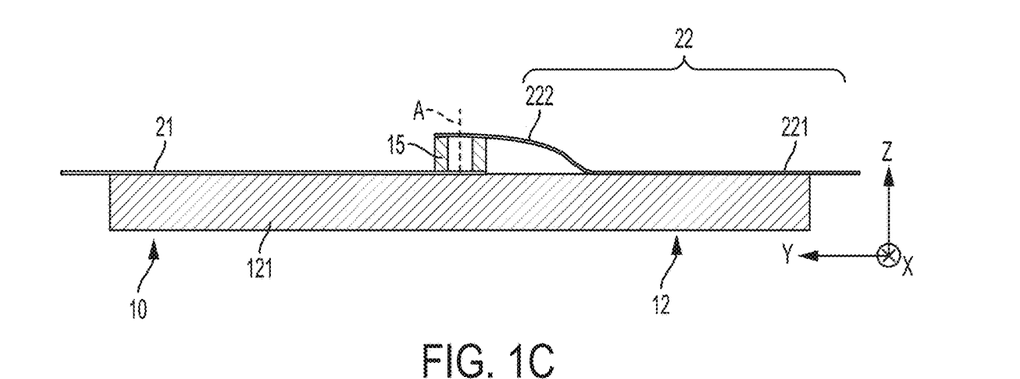
FIG. 1C is a cross-sectional view of the microwave-to-optical transducer device, the plane upon which the view is taken being indicated by a dashed line in FIG. 1B, according to embodiments of the invention.

Turning now to a more detailed description of aspects of the present invention, FIGS. 1A, 1B, and 1C depict a microwave-to-optical transducer device 10. FIG. 1A is a three-dimensional view of the microwave-to-optical transducer device 10, FIG. 1B is a top view, and FIG. 1C is a cross-sectional view taken along the dashed line in FIG. 1B. FIGS. 1A, 1B, and 1C can generally be referred to as FIG. 1.

The transducer 10 comprises an anchorage structure 11, 12. This structure notably includes a bar 121 that extends in a plane (x, y). The bar 121 delimits (e.g., separates) two voids 120, 125, i.e., hollows, in the plane (x, y). In other words, projections of the voids 120, 125 in the plane (x, y) are arranged side-by-side in said plane (x, y) and on each longitudinal side of the projection of the bar 121 in that same plane (x, y).

The transducer 10 further includes a piezoelectric beam 15, which is structured as an optical cavity. The piezoelectric beam 15 extends transversally to the bar 111, 121, parallel to said plane (x, y), i.e., transversally to the plane (y, z), which is ideally parallel to lateral faces of the bar 121. However, the beam 15 is not laterally affixed to the bar 121 of the anchorage structure. Rather, the beam 15 is anchored on a resting point on the bar 111, 121. That is, the beam 15 rests on the bar 121. In the proposed configuration, the beam 15 extends outwardly, beyond the resting point and on each side of the bar 121, so as to overhang each of the two voids 120, 125.

The beam 15 typically has a form factor as it is normally longer along axis x than it is wide (along axis y or z), especially where the beam is realized in the form of a 1D photonic crystal (PhC) cavity, as depicted in FIG. 1. Various other 1D optical cavity designs can, however, be contemplated. Still, the beam 15 may be embodied as a blade or membrane (e.g., as a 2D PhC cavity). Thus, the terminology "beam" should not be narrowly construed. In other words, a "beam", as contemplated herein, can have the shape of a bar (or shaft), a plate (or slab), etc.

Preferably, the anchorage structure 11, 12 involves two bars 111, 121 that extend oppositely. The bars 111, 121 have a form factor as well, for reasons that will become apparent later: each bar 111, 121 is longer along the axis y than it is wide (along axis x). The thickness of the anchor structure (along axis z) is less important (the bars 111, 121 could for instance be more extended in z than y), although a compact structure is typically preferred, such that the bars 111, 121 will typically have a limited extension along z.

The anchorage structure may for example be realized in the form of distinct anchorage elements 11, 12, arranged side-by-side in the microwave-to-optical transducer device 10. Preferably, the structure 111, 15, 121 is symmetric, so as to best accommodate symmetric mechanical modes, as discussed below. A structure as shown in FIG. 1 can be obtained using standard lithography techniques, as discussed later.

The piezoelectric beam 15 is an optomechanical element, which is structured so as to define an optical cavity such as a PhC cavity, e.g., a nanophotonic resonator or nanocavity. The cavity may also be obtained as a Bragg grating or comprise Bragg mirrors on each end of the beam 15, for example. Particularly, the beam 15 is configured to allow a confined optical cavity mode. In addition, the beam 15 is designed such that it may be piezoelectrically actuated, i.e., produce a change of polarization when applying a mechanical stress thereto and, conversely, be subject to mechanical deformation upon application of an electrical field.

In other words, the beam 15 allows an optomechanical interaction, which exploits colocalized optical and mechanical eigenmodes of the cavity optomechanical system. Light in the optical mode couples with the mechanical motion of the cavity because the optical cavity resonance frequency depends on the cavity geometry. On the one hand, the piezoelectric effect leads to charge displacement resulting from the mechanical deformation, which, in turn, leads to an electric field in the device, whence the possibility for it to act as an optical-to-microwave transducer. On the other hand, through the inverse piezoelectric effect, an applied field leads to a deformation of the optical cavity and therefore to a change in the optical resonator frequency, thus permitting the reverse process, namely microwave-to-optical transduction. For coupling to the mechanical eigenmode, the applied electric potential should match the field of the eigenmode. In this way, bi-directional microwave-to-optical transduction can be achieved.

The optical signal can be coupled into and out of the PhC in a variety of ways, e.g., through a tapered fiber or through an integrated waveguide, as understood by one skilled in the art, e.g., in the field of silicon photonics. This is discussed later in reference to FIG. 3.

In transducers 10 as discussed herein, outer portions of the cavity beam 15 extend beyond the anchor point(s) to allow free, unclamped motion of a stationary mechanical mode, e.g., allowing motion perpendicularly to the anchoring axis (axes), which are parallel to axis z in FIG. 1. The electric field, however, can be in a different direction, depending on what is required to drive the mechanical mode of the piezoelectric beam 15. In other words, the overhanging structure reduces the clamping by minimizing the surface contact at the level of the bar(s) 111, 121. In turn, the clamping reduction favorably impacts the piezoelectric coupling. Note, the outer ends of the beam 15 are preferably free ends. Still, the ends of the beam 15 may be tethered at a large distance from the cavity region, i.e., far from the localized mechanical mode.

Moreover, the proposed structure makes it possible to reduce mechanical losses, because the anchoring is perpendicular to the direction of mechanical energy flux of the mechanical eigenmode of the beam. In particular, little or no energy transport may be seen along the direction z of anchoring, which reduces losses to the substrate or surrounding parts of the structure. In that respect, embodiments of the present transducers notably allow a direct actuation of a mechanical eigenmode without actuating an intermediate travelling acoustic wave. This, in turn, makes it possible to reduce further losses to the substrate underneath (not shown) and/or into other modes of the beam 15 and other portions of the device 10. Furthermore, a compact design can be achieved, to reduce the mechanical mode volume.

Interestingly, the present approach allows transduction in both the classical and quantum regime. Thus, the present devices 10 can advantageously be used in microwave-driven devices such as superconducting devices, e.g., superconducting microwave circuits, and in particular, in quantum information processing devices, as in preferred embodiments discussed below. For quantum applications involving superconducting qubits, electrodes contacting the piezoelectric beam 15 can be made from a (potentially) superconducting material. More generally, the present approach is applicable to various combinations of optical and mechanical eigenmodes, which, in turn, allow transduction of a broad range of frequencies.

Figure 2A:
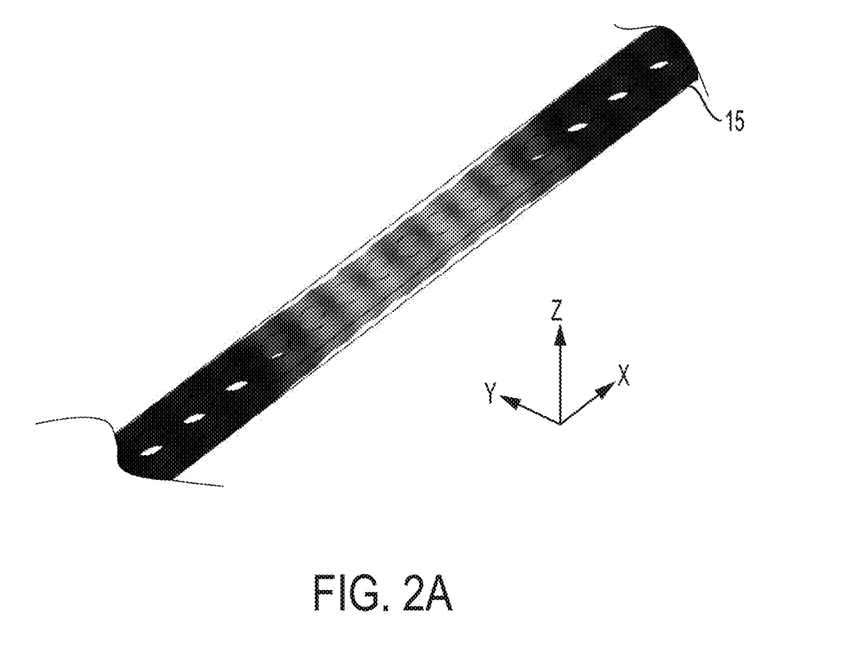
FIG. 2A is a three-dimensional view of the piezoelectric beam of the microwave-to-optical transducer device (such as shown in FIGS. 1A, 1B, 1C), showing mechanical deformation of the beam in which density plots of the magnitude of deformation are also superimposed, and where a selected state of deformation of the beam is illustrated, i.e., a breathing mode, which expands and contracts in the plane (x, y), as involved in embodiments of the invention.
Figure 2B:
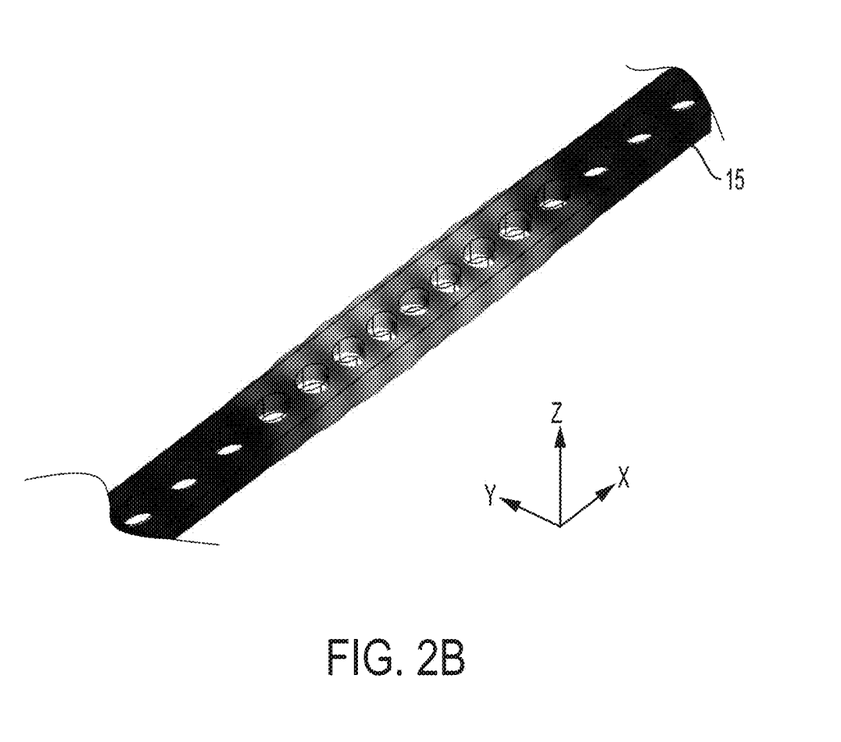
FIG. 2B is a three-dimensional view of the piezoelectric beam of the microwave-to-optical transducer device (such as shown in FIGS. 1A, 1B, 1C), showing mechanical deformation of the beam in which density plots of the magnitude of deformation are also superimposed, and where another selected state of deformation of the beam is illustrated, i.e., a breathing mode, which expands and contracts in the plane (x, y), as involved in embodiments of the invention.

FIGS. 2A and 2B are three-dimensional views of the piezoelectric beam of the microwave-to-optical transducer device (such as shown in FIGS. 1A, 1B, 1C), showing mechanical deformation of the beam in which density plots of the magnitude of deformation are also superimposed. The piezoelectric beam represents a selected state (one state in FIG. 2A and another state in FIG. 2B) of deformation of a mechanical eigenmode, i.e., a breathing mode, which expands and contracts in the plane (x, y), according to embodiments of the invention.

Referring now more specifically to FIGS. 2A and 2B, the beam 15 is preferably configured (in the device 10) so as for a piezoelectrically-induced mechanical motion of the beam 15 to have a largest component in a direction distinct (i.e., different) from the anchoring direction z, i.e., the direction normal to the plane (x, y) of the anchoring structure 11, 12. In other words, the beam 15 may be designed in such a manner that mechanical motion therein is (essentially) not along the anchorage direction z. For example, the piezoelectrically-induced mechanical motion may be (essentially) confined to the plane (x, y), as depicted for two selected states of a breathing mode in FIGS. 2A and 2B. Comparing the two figures, one sees that this mode expands and contracts in the plane (x, y). That is, the energy transport is mainly in the plane (x, y) in that case, with a negligible component in the z-direction.

Referring back to FIG. 1, the electrodes 21, 22 are preferably arranged so as to contact the beam 15 on opposite points thereof, i.e., above and below the beam 15 (using the same orientation as in FIG. 1C). The opposite contact points define a contact axis A (see FIGS. 1A and 1C), which is perpendicular to the plane (x, y) of the structure 11, 12. Note, the electrodes 21, 22 are preferably off-centered from the center of the beam 15 to prevent excessive absorption of the trapped light.

The structure and material of the beam 15 may notably be chosen such that the contact axis A extends parallel to the axis of electrical polarization of the beam 15, in operation (i.e., during operation). It is furthermore possible to achieve a piezoelectrically-induced mechanical motion that is (essentially) confined in the plane (x, y), that is, perpendicular to the electrical polarization. As it may be realized, this can notably be achieved using materials such as single crystalline gallium phosphide (GaP) for the beam 15.

Preferably, the electrodes 21, 22 are, each, at least partly arranged on the bar 121. In that respect, the bar 121 is preferably made sufficiently narrow (in the direction x), to reduce the clamping by the electrode pair and thereby increase the electromechanical coupling strength. Where two resting points are used, as in FIG. 1, each of the supporting bars 111, 121 should ideally be made sufficiently narrow, for the same reasons. Now, since the electromechanical coupling can be defined as a volume integral, it increases with the area. There is accordingly a trade-off between the clamping and the coupling strength. Narrow bars 111, 121 imply less clamping but also imply smaller electrodes 21, 22 on the bar 121 and, thus, less area for piezoelectric actuation. In other words, the bar 121 should be sufficiently narrow to limit the clamping but not too narrow, in order to maintain a satisfactory electromechanical coupling. In addition, the bar 121 may be located sufficiently close to the cavity center to favor the electromechanical coupling. Since the system 111, 15, 121 is preferably symmetric, see below, the bars 111, 121 preferably have the same width (along x).

In practice, preferred dimensions for the beam 15 and bars 111, 121 are as follows:

Beam 15: length (along axis x) between about 10 μm and 100 μm; width (axis y) between 0.1 μm and 1 μm (for a 1D PhC) or between 1 μm and 1000 μm (for a 2D PhC); height (axis z) between 0.1 μm and 2 μm; and Bars 111, 121: length (along axis y) between 0.2 μm and 1000 μm; width (axis x) between 0.05 μm and 0.5 μm; height (axis z) between 1 μm and 10 μm.

Of course, the above dimensions are given for the sake of exemplification. Optimal values will nevertheless typically depend on the chosen materials and the optical wavelength. Moreover, some of the dimensions are not necessarily bounded from above, as the one skilled in the art may appreciate.

The bars 111, 121 are preferably located at a distance that is approximately between 4 μm and 10 μm from the center of the beam 15 in the direction parallel to the axis x. A minimal distance of 4 μm is preferred, as it typically is sufficient to prevent any substantial reduction of the optical quality factor, while the typical extension of the mechanical mode suggests a maximal distance of 10 μm from the center of the beam 15. The outer overhanging portions of the beam 15 shall preferably have a length (parallel to the axis x) of at least 2 μm (to prevent clamping). Still, the overhang should preferably be less than 50 μm, in order to avoid bending of the overhang (the beam 15 should not touch the underlying structure). In addition, the structure 111, 15, 121 is preferably symmetric, so as to best accommodate symmetric mechanical modes.

Note, as predefined, the opposite points of contact of the electrodes 21, 22 on the beam 15 are preferably located at anti-nodes of a stationary mechanical mode corresponding to the piezoelectrically-induced mechanical motion, in operation. That is, the contact axis A should ideally pass through a position corresponding (or close) to a local maximum of an amplitude of this mode.

As further seen in FIG. 1, each of the electrodes 21, 22 may for example be patterned so as to extend, at least partly, on the top surface of the bar 121, i.e., the surface opposite to the lower longitudinal face of the beam 15. In other words, the contact axis A may pass through a portion of the upper surface of the bar 121 that faces a portion of the lower longitudinal face of the beam 15, as best seen in FIG. 1C.

For example, and as seen in FIG. 1C, the first electrode 21 may extend on (or over) the top surface of the bar 121, on one (longitudinal) side of the beam 15, so as to contact the beam 15 from below. That is, the first electrode 21 extends up to a contact point on the lower longitudinal face of the beam 15. On the other hand, the second electrode 22 may partly extend on that same top surface but on the other (longitudinal) side of the beam 15, so as to reach the upper contact point on top of the beam 15. Still, the electrodes 21, 22 need not be in direct mechanical contact with the bar 121 and/or the beam 15. For example, constraints in the fabrication process may lead to a thin intermediate layer (not shown) between the lower electrode 21 and the beam 15. More generally, there could be a gap between each or any of the electrodes 21, 22 and the beam 15 and/or the bar 121, in which the gap is filled with another material.

To achieve this, the second electrode 22 may comprise distinct portions 221, 222. A first portion 221 of the electrode 22 extends on the top surface of the bar 121, while a second portion 222 connects the first portion 221 to the top side of the beam 15. Note, the depictions of FIGS. 1A, 1B, and 1C represent this connection 222 as a rounded ramp, tilted an angle with respect to the upper surface of the bar 121. However, one skilled in the art will appreciate that this connection 222 may have any suitable shape (e.g., an air bridge, a nanowire connector), depending on the technique used to obtain connection 222.

The electrode configuration shown in FIG. 1 is well suited for a beam consisting of single crystalline gallium phosphide (GaP), for example. Such a material is particularly well suited to obtain in-plane breathing modes such as depicted in FIGS. 2A, 2B, in which in-plane breathing modes are (essentially) confined to (x, y), perpendicular to the electrical polarization of the beam 15 and is compatible with a simple electrode pair configuration 21, 22 (FIG. 1). Still, various other piezoelectric materials can be contemplated to fabricate the piezoelectric beam 15 and the electrode orientation may thus need be adjusted. Accordingly, various electrode configurations may be contemplated, which may differ from the configuration shown in FIG. 1. For example, beyond gallium phosphide, the beam 15 may notably comprise aluminum nitride (AlN), barium titanate ($BaTiO_3$), lead zirconate titanate ($PbZr_xTi_{1-x}O_3$), gallium nitride (GaN), gallium arsenide (GaAs), indium phosphide (InP), or lithium niobate ($LiNbO_3$).

Applications in the field of quantum computing will typically require using a potentially superconducting material for each of the electrodes 21, 22. A "potentially superconducting material" (referred to as a superconducting material in the following) is a material such as niobium (Nb), aluminum (Al) or titanium nitride (TiN), which can become superconducting under certain conditions of temperatures and magnetic fields. In variants, the electrodes 21, 22 may notably comprise indium (In), tin (Sn), zinc (Zn), vanadium (V), lead (Pb), an alloy such as $Nb_3Al$, and/or a compound such as niobium-titanium nitride (NbTiN).

As further seen in FIG. 1, the anchorage structure may possibly comprise two distinct anchorage elements 11, 12. Note, such anchorage elements 11, 12 will nevertheless be mechanically connected, in as much as anchorage elements 11, 12 will likely sit on a common substrate (not shown). Each element 11, 12 may for instance be patterned on an underlying substrate and structured as a frame 111, 112, 113, 114, and frame 121, 122, 123, 124, respectively. Each frame 111-114 and 121-124 interconnects one of the two bars 111, 121 to other members 112-114, 122-124, hence making up two frames arranged side-by-side, in-plane, so as to provide a linear arrangement of three successive voids 115, 120, 125, as described earlier.

Members of the frames (frames 111-114 and 121-124) or the substrate (not shown) on which they rest may for instance comprise $Al_2O_3$ (sapphire). In variants, said other members (of the frames 111-114, 121-124 and/or the substrate) may comprise silicon (Si), silicon dioxide ($SiO_2$), or silicon nitride ($Si_3N_4$), for example. Yet, sapphire is preferred (as the frames 111-114, 121-124 and/or the substrate)

in as much as it lowers microwave losses, while minimizing the thermal expansion mismatch. In particular, using $SiO_2$ for the underlying insulator may cause excessively large microwave losses for operation in the quantum regime. Also, the bars 111, 121 may, in variants, form part of a structure that does not necessarily form a closed frame.

The present transducer devices 10 can be fabricated using known lithographic techniques. For example, a GaP-on-insulator substrate can be obtained by wafer bonding a $GaP/Al_xGa_{1-x}P/GaP$ heterostructure (source wafer) to an oxidized silicon wafer with an electrode structure (target wafer). The source wafer is grown by metal-organic chemical vapor deposition (MOCVD). To prepare the target wafer, a Nb layer is sputter-deposited on an oxidized silicon wafer. The electrodes are patterned by e-beam lithography and inductively-coupled plasma reactive ion etching (ICP-RIE). The devices are cladded with $SiO_2$ and planarized by chemical-mechanical polishing, which completes the target wafer. The source wafer is then directly bonded to the target wafer after surface preparation by deposition of 5 nm of $Al_2O_3$. To remove the original GaP substrate of the $GaP/Al_xGa_{1-x}P/GaP$ heterostructure, which was only required for growth of the GaP device layer, the substrate is first thinned by lapping, then etched in a dry etch process which removes GaP selectively with respect to $Al_xGa_{1-x}P$. The $Al_xGa_{1-x}P$ etch-stop layer is removed in hydrochloric acid, leading to the desired GaP-on-insulator wafer. The devices are patterned on this wafer via electron-beam lithography and ICP-RIE. The PhCs are released in a final step by wet etching in buffered hydrofluoric acid to remove the underlying $SiO_2$. The parts which are not meant to be released are protected with a positive photoresist. For the fabrication of the top electrode, a sacrificial layer of photoresist is deposited and patterned via optical lithography and wet etching. A Nb layer is then sputter deposited. The Nb electrode is patterned by electron-beam lithography and ICP-RIE. Afterwards, the electron-beam resist as well as the sacrificial layer are removed.

Figure 3:
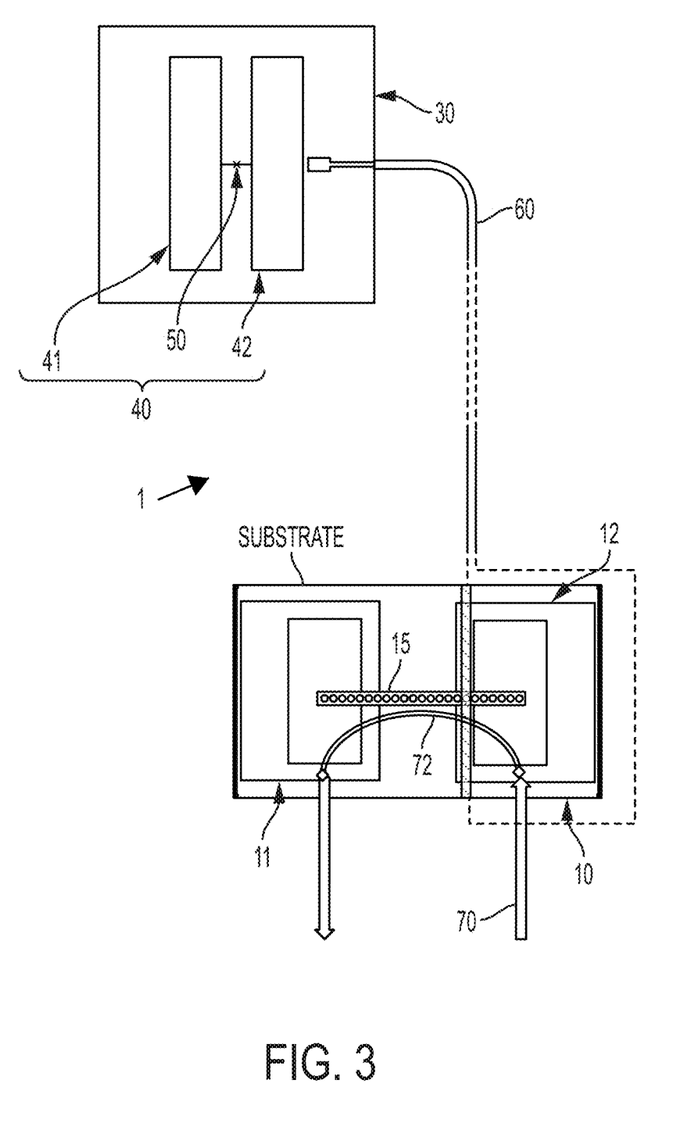
FIG. 3 is a block diagram schematically illustrating selected components of a superconducting microwave circuit (a quantum information processing system), as in embodiments.

Referring now to FIGS. 1 and 3, another aspect of the invention is now described, which discusses a microwave circuit 1 and the microwave-to-optical transducer device 10. The circuit 1 comprises the microwave-to-optical transducer 10, as described earlier in reference to FIGS. 1 and 2. That is, the circuit 1 includes an anchorage structure 11, 12 with one or more bars 111, 121 that laterally delimit (i.e., separate) two or more voids 115, 120, 125, and a transverse piezoelectric beam 15, wherein the beam 15 is anchored on the bar(s) 111, 121.

Electrodes 21, 22 of the transducer 10 will typically be coupled to electrically conducting structures 60 of the circuit 1, as shown in FIG. 3. Just like the electrodes 21, 22, the electrically conducting structures 60 need to be designed (and notably dimensioned) so as to support an electromagnetic field (EMF) that allows, in turn, the circuit 1 to be operated in the microwave domain. That is, the structures 21, 22, 60 must have characteristic dimensions that are compatible with an EMF in the microwave domain. The microwave domain extends between about 300 MHz and 300 GHz, in frequency, which approximately corresponds to a vacuum wavelength span of 1 mm to 1 m.

The transducer 10 may for example be configured in the circuit 1 as a modulator (for transducing microwaves to an optical signal), a receiver (for transducing an optical signal to microwaves), and/or an amplifier (providing gain in the transduction). The direction of operation may for instance be controlled by the detuning of a pump laser applied to the optical cavity, as understood by one skilled in the art.

Optical-to-microwave conversion is obtained by blue-detuning the pump frequency with respect to the optical cavity. If the pump tone is red-detuned, this leads to a microwave-to-optical conversion. The device 10 can further be used as an amplifier if the circuit 1 provides gain in the process of transduction. When using the device 10 as a transducer, however, this is typically not desired since amplification for an ideal transducer comes at the cost of added noise.

As illustrated in FIG. 3, the circuit may for example be embodied as a superconducting microwave circuit 1 configured as a quantum information processing device. That is, the circuit 1 may further comprise one or more superconducting qubits 30 and corresponding drive lines 60, connected to the qubits 30 (predefined) for driving the qubits 30, in operation. Only one qubit 30 and one drive line 60 are depicted in FIG. 3, for conciseness, but it should be appreciated that more qubits 30 and drive lines 60 can be utilized. Each qubit 30 includes a pair 40 of capacitor plates 41, 42, which are coupled via a Josephson junction 50. The qubits 30 may notably serve as computational qubits or as couplers in the quantum information processing device. The couplers may have a fixed or tunable frequency in practice. For example, the frequency of the coupler may be modulated so as to drive energy transitions in the quantum information processing device. In other words, energy transitions in the system can be driven by applying harmonic microwave signals (i.e., coherent microwave tones) to the tunable coupler. A controller (e.g., including one or more drive lines 60) can be used to apply harmonic microwave signals or microwave signal pulses to components of the circuit and trigger the desired transitions. This may notably require adjusting amplitudes and phases of the signals applied, in addition to modulating their frequency.

One or more transducers are relied on to communicate with the quantum device over long distances. For example, and as depicted in FIG. 3, a transducer 10 can be connected to a drive line 60 so as to drive the qubit 30. In other words, a microwave signal can be applied to the drive line 60 via the transducer 10, whose electrodes 21, 22 (FIG. 1) are suitably connected to electrically conducting structures of the drive line 60, upon optical stimulation of the transducer 10. This allows optical-to-microwave transduction via the intermediate mechanical resonator 15, to drive quantum signals, thus enabling long distance communication with the qubit 30. Conversely, a microwave signal from the quantum circuit (e.g., from the qubit 30) can be coupled back into the transducer to produce an optical signal. That is, microwave-to-optical transduction is possible, because a microwave response (a tone or a pulse) from the qubit 30 results in an electric field in the beam 15, leading to mechanical motion of the beam 15 and, in turn, modulation of light in the optical cavity (of the beam 15), which can be out-coupled (or transmitted/emitted) from the beam 15 and conveyed via an optical medium 70.

To that aim, an optical communication medium 70 may be optically coupled to the circuit 1 to couple light into and/or out of the transducer 10. In variants, the circuit 1 may further include such an optical communication medium 70. While the core circuit (e.g., components 21, 22, 30 and 60) has to be superconducting (such that the chip bearing the structures 21, 22, 30 and 60 needs to be subject to certain conditions of temperatures and magnetic fields), the optical circuit 70 does not. Thus, long distance communication with the qubit 30 is possible even though the optical circuit 70 is at room temperature.

In FIG. 3, the nanobeam cavity 15 is assumed to be side-coupled to a waveguide 72. It may for example be side-coupled to a waveguide connected with two grating couplers. The waveguide 72 is typically integrated in the device 10. Yet, other optical coupling schemes can be contemplated, which use tapered fibers, for example.

For the sake of brevity, conventional techniques related to semiconductor (and superconducting device) and integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of semiconductor/superconducting devices and semiconductor-based ICs are well known and so, in the interest of brevity, many conventional steps will only be mentioned briefly herein or will be omitted entirely without providing the well-known process details.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

The phrase "selective to," such as, for example, "a first element selective to a second element," means that the first element can be etched and the second element can act as an etch stop.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilize a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A device comprising:
   an anchorage structure comprising a bar delimiting voids; and
   a piezoelectric structure configured as an optomechanical element, the piezoelectric structure traversing the bar and being over at least a portion of each of the voids.

2. The device of claim 1, wherein the bar extends in a plane.

3. The device of claim 1, wherein the voids are on opposing sides of the bar.

4. The device of claim 1, wherein the piezoelectric structure is configured such that a piezoelectrically-induced mechanical motion of the piezoelectric structure has a largest component in a direction distinct from a direction normal to a plane in which the bar extends.

5. The device of claim 4, wherein the piezoelectric structure is further configured such that the piezoelectrically-induced mechanical motion is primarily confined to the plane.

6. The device of claim 4, further comprising electrodes arranged so as to be at least partly positioned on the piezoelectric structure at opposite points.

7. The device of claim 6, wherein the opposite points define a contact axis that is perpendicular to the plane.

8. The device of claim 7, wherein the contact axis is defined to extend parallel to an axis of electrical polarization of the piezoelectric structure.

9. The device of claim 6, wherein the opposite points are predefined to be located at anti-nodes of a stationary mechanical mode corresponding to a piezoelectrically-induced mechanical motion of the piezoelectric structure.

10. The device of claim 6, wherein the electrodes extend, at least partly, on a surface of the piezoelectric structure that is opposite to a longitudinal face of the piezoelectric structure.

11. The device of claim 10, wherein a first one of the electrodes extends on the surface of the piezoelectric structure on one longitudinal side of the piezoelectric structure, while a second one of the electrodes partly extends on the surface but on another longitudinal side of the piezoelectric structure.

12. The device of claim 6, wherein a first one of the electrodes extends to one of the opposite points and a second one of the electrodes extends to another one of the opposite points.

13. The device of claim 6, wherein the electrodes comprise a superconducting material.

14. The device of claim 6, wherein the electrodes comprise niobium.

15. The device of claim 1, wherein the piezoelectric structure comprises gallium phosphide.

16. The device of claim 1, wherein the anchorage structure a comprises another bar, the bar and the another bar extending oppositely in a plane so as to delimit the voids and another void in the plane.

17. The device of claim 16, wherein two of the voids and the another void are on outer sides of the bar and another bars in the plane, whereas a remaining one of the two of the voids and the another void is between the two of the voids and the another void.

18. The device of claim 1, wherein the anchorage structure comprises two distinct anchorage elements, each structured as a frame.

19. The device of claim 1, wherein the piezoelectric structure is structured as a one-dimensional photonic crystal cavity.

20. A microwave circuit comprising:
    a transducer comprising:
       an anchorage structure comprising a bar delimiting voids; and
       a piezoelectric structure configured as an optomechanical element, the piezoelectric structure traversing the bar and being over at least a portion of each of the voids; and
    a qubit coupled to a drive line, the transducer being configured to couple to the drive line.

* * * * *